United States Patent
Manacorda et al.

(10) Patent No.: US 12,055,622 B2
(45) Date of Patent: Aug. 6, 2024

(54) PHOTOGRAMMETRIC SYSTEM FOR POSITIONING GEORADAR DATA ON THE MEASUREMENT SCENARIO

(71) Applicant: IDS GEORADAR S.R.L., Milan (IT)

(72) Inventors: Guido Manacorda, Pisa (IT); Davide Pasculli, Leghorn (IT); Alessandro Simi, Leghorn (IT); Andrea Buonaccorsi, Massarosa (IT)

(73) Assignee: IDS GEORADAR S.R.L., Milan (IT)

( * ) Notice: Subject to any disclaimer, the term of this patent is extended or adjusted under 35 U.S.C. 154(b) by 567 days.

(21) Appl. No.: 17/288,419

(22) PCT Filed: Oct. 24, 2019

(86) PCT No.: PCT/IB2019/059108
§ 371 (c)(1),
(2) Date: Apr. 23, 2021

(87) PCT Pub. No.: WO2020/084551
PCT Pub. Date: Apr. 30, 2020

(65) Prior Publication Data
US 2021/0382167 A1    Dec. 9, 2021

(30) Foreign Application Priority Data

Oct. 24, 2018    (IT) .................. 102018000009761

(51) Int. Cl.
*G01S 13/86* (2006.01)
*G01S 13/88* (2006.01)
*G01S 13/89* (2006.01)
(52) U.S. Cl.
CPC .......... *G01S 13/867* (2013.01); *G01S 13/885* (2013.01); *G01S 13/89* (2013.01)

(58) Field of Classification Search
CPC ...... G01S 13/867; G01S 13/885; G01S 13/89; G06V 40/00; G06V 30/00; G06V 20/00;
(Continued)

(56) References Cited

U.S. PATENT DOCUMENTS

| | | | |
|---|---|---|---|
| 9,643,736 B1 * | 5/2017 | Ell | B64D 47/08 |
| 9,646,415 B2 * | 5/2017 | Hanson | G06F 18/40 |

(Continued)

FOREIGN PATENT DOCUMENTS

| | | |
|---|---|---|
| GB | 2 511 908 A | 9/2014 |
| WO | 2018/203259 A1 | 11/2018 |

OTHER PUBLICATIONS

Application_Affine_Coregistration.pdf, https://www.researchgate.net/profile/Ilker-Yaylali/publication/240956118_Application_of_Affine_Transformations_for_the_Co-registration_of_SPECT_Images/links/53ecccd40cf23733e804c70c/Application-of-Affine-Transformations-for-the-Co-registration-of-SPECT-Images.pdf (Year: 2002).*

(Continued)

*Primary Examiner* — Olumide Ajibade Akonai
*Assistant Examiner* — Yonghong Li
(74) *Attorney, Agent, or Firm* — Maschoff Brennan

(57) ABSTRACT

A method for ground penetrating radar analysis of a scenario, having a surface, with respect to a cartesian reference system S(x,y) having origin O(0,0) and axes x and y. The method comprises a step of prearranging a gpr apparatus that comprises at least one gpr sensor, a control unit, a centre of reference $C(x_c, y_c)$ having coordinates $x_c$ and $y_c$ with respect to the cartesian reference system S(x,y), at least one image acquisition devices, each image acquisition devices having a pointing direction $\gamma_j$ known with respect to the centre of reference $C(x_c, y_c)$. The method comprises then the steps of (Continued)

handling the gpr apparatus on the surface and detecting possible underground objects by means of gpr technique.

13 Claims, 3 Drawing Sheets

(58) Field of Classification Search
CPC .... G06T 1/00; G06T 3/00; G06T 5/00; G06T 7/00; G06T 2201/00; G06T 2211/00; G06K 5/00; G06K 7/00
See application file for complete search history.

(56) References Cited

U.S. PATENT DOCUMENTS

| | | | |
|---|---|---|---|
| 9,715,008 B1* | 7/2017 | Côté | G01S 13/885 |
| 2015/0356341 A1* | 12/2015 | Eccles | G06V 10/143 |
| | | | 382/224 |
| 2017/0323480 A1* | 11/2017 | LaBarca | G06T 19/006 |
| 2018/0173963 A1* | 6/2018 | Taylor | G06V 20/52 |

OTHER PUBLICATIONS

Euclidean distance—Wikipedia.pdf from https://web.archive.org/web/20180208090106/https://en.wikipedia.org/wiki/Euclidean_distance (Year: 2018).*

* cited by examiner

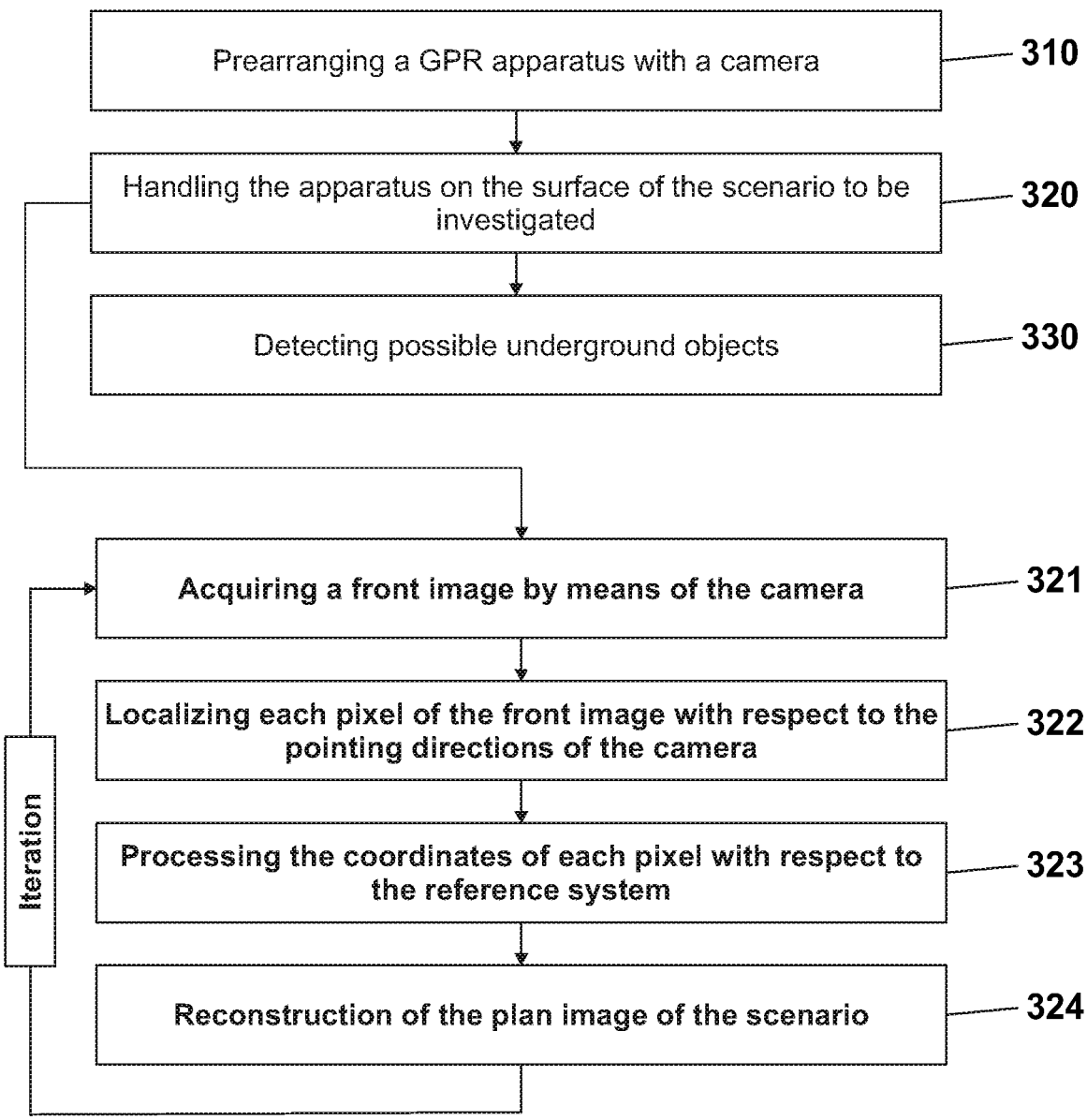

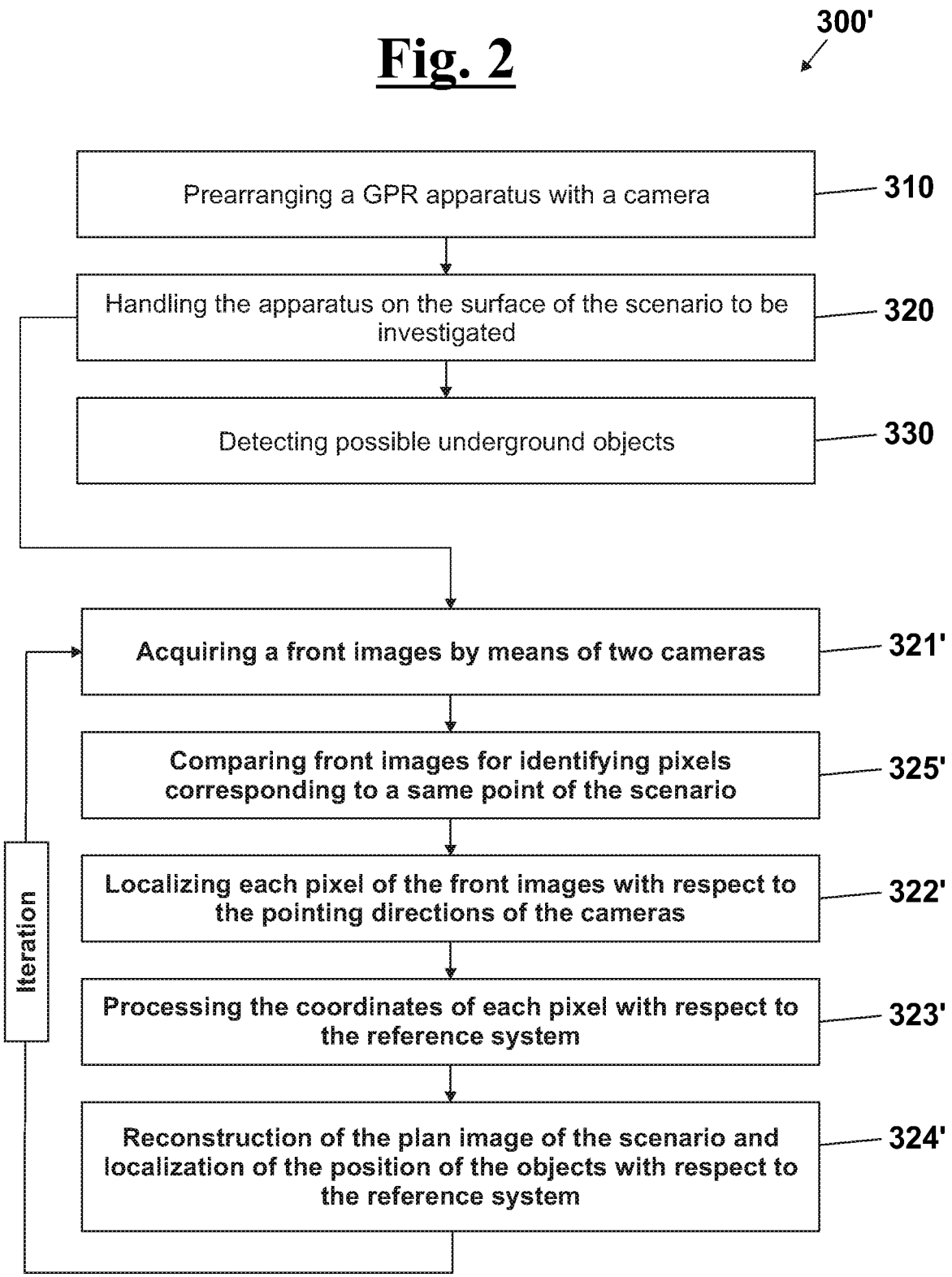

PHOTOGRAMMETRIC SYSTEM FOR POSITIONING GEORADAR DATA ON THE MEASUREMENT SCENARIO

FIELD OF THE INVENTION

The present invention relates to the field of investigations using GPR (Ground Penetrating Radar) technique.

In particular, the invention relates to a method for assisting the movement and location of a GPR apparatus during the investigation of a scenario.

DESCRIPTION OF THE PRIOR ART

As known, the search for underground objects using GPR (Ground Penetrating Radar) technique finds many applications in the field of civil engineering, geology and archaeology.

The GPR devices provide at least one RF radio frequency receiver/emitting antenna (GPR sensor) and a remote control unit comprising a PC and an interface card with the antenna. The GPR sensor is moved on the surface of the scenario to be investigated, and once the transmission of the RF signal is initiated, the received feedback signals are generally displayed as bi-dimensional images.

To make a correct localization in the space of the detected objects, it is necessary to provide tools to help locating the GPR equipment, when it detects an underground object, with respect to a known reference system. The main solutions used to derive the position of the GPR equipment in real-time space include, for example, the localization by GPS and/or by laser beam with respect to a local station of known position (total station).

However, these solutions are not always applicable. In particular, GPS localization is problematic in even partially covered places, while localization by laser beam is impossible in the presence of objects interposed between the GPR equipment and the local station.

Moreover, both systems do not allow the operator to display in real time the coordinates of objects visible in the scenario both in front of him and in planimetric view, an aspect that would greatly help a correct movement of the GPR equipment and the interpretation of data collected.

US2017323480 discloses a system based on ground-penetrating radar (GPR) that visually depicts objects hidden by a surface. In particular, it provides a realistic visualization of the hidden objects through so-called augmented reality techniques. Thanks to such visualization, interaction with hidden objects is easier and less prone to errors. The system can have two cameras in order to have a more realistic view of the environment.

However, US2017323480 does not provide in any way the possibility of creating a planimetry of the scenario that includes the GPR antenna, hidden objects and visible objects.

SUMMARY OF THE INVENTION

It is therefore a feature of the present invention to provide a method for ground penetrating radar analysis of a scenario that allows to locate objects within the scenario with respect to the position assumed by the GPR apparatus and with respect to a predefined reference system, without needing to process information coming from other positioning systems (eg GPS or local station).

This and other objects are achieved by a method for ground penetrating radar analysis of a scenario, having a surface, with respect to a Cartesian reference system $S(x,y)$ having origin $O(0,0)$ and axes x and y, said method comprising the steps of:

prearranging a GPR apparatus defining a centre of reference $C(x_c, y_c)$ integral to said GPR apparatus (100), said centre of reference $C(x_c, y_c)$ having coordinates $x_c$ and $y_c$ with respect to said Cartesian reference system $S(x,y)$, said GPR apparatus comprising:
at least one GPR sensor;
a control unit;
at least two image acquisition devices having respective pointing directions $\gamma_1$ and $\gamma_2$ known with respect to the centre of reference $C(x_c, y_c)$;
handling the GPR apparatus on the surface;
detecting possible underground objects by means of GPR technique;
whose main feature is that the step of handling comprises the sub-steps of:
acquiring at least two front images $I_F$ of the scenario by means of respective image acquisition devices, each image comprising a plurality of pixels;
comparing the front images $I_F$ for identifying pixel $P_i$ corresponding to a same point of the scenario;
localizing each pixel $P_i$ of each front image $I_F$ with respect to both said pointing directions $\gamma_1$ and $\gamma_2$, said sub-step of localization comprising a definition of at least one couple of angles $\vartheta_{xi}$ and $\vartheta_{yi}$ for each pixel $P_i$;
processing, for each pixel $P_i$, coordinates $x_i$ and $y_i$ with respect to the Cartesian reference system $S(x,y)$;
reconstructing a plan image $I_P$ of the scenario, said plan image $I_P$ comprising the plurality of pixels $P_i$ arranged in the coordinates $x_i$ and $y_i$.

Thanks to localization of the pixels in the scenario plan, it is possible to know the dimensions and distance from the GPR equipment of any object present above the surface of the scenario.

More specifically, a suitable software algorithm, using the characteristic parameters of the cameras, is able to determine the distance, with respect to the GPR antenna, of an object framed by both photographic devices. This triangulation algorithm receives the information of the angle of observation for both cameras as input and returns as a result the position (x,y) with respect to the center between the two cameras, and therefore with respect to the GPR antenna.

To perform the triangulation must be known:
the "optical centre" of each camera, namely the exact position in the 3D space of the sensor of the room on which the images are impressed;
the "baseline" of the stereo-camera, namely the distance between the two optical centres of the cameras;
the pointing angles in the 3D space of the two cameras with respect to a reference centre, and therefore also the angles of rotation of a camera relative to the other.

Moreover, to correctly perform the triangulation, one must also take into account the optical distortion parameters introduced by the camera lens, which must be appropriately compensated by the algorithm. These parameters are estimated through a particular calibration phase, together with the others previously mentioned parameters.

It should be noted that the cameras may have different viewing angles and therefore do not necessarily have to point in the same direction in which the GPR is moved for scanning. However, it is necessary that part of the angle of view of both cameras is "superimposed", in the sense that at least part of the scene is framed by both the image acquisition devices in order to triangulate a given object, which must fall into the overlapping area or, in other words, must be present in the frame of both cameras.

The triangulation algorithm is based on determining the point of intersection between two lines in the three-dimensional space, which pass through the optical centre of the respective camera and "meet" at the point identified by the object. Knowing the distance between the cameras (baseline) we obtain the position in the 3D space of the object. The input information is given by the two pairs of pixels that indicate the same object framed by the two cameras: each pixel is associated with a straight line in space, exiting from the optical centre of the system.

Since due to errors in the estimation of the parameters mentioned above, or to the resolution of the camera itself, it is possible that the two lines do not have a common intersection point, the algorithm determines the point in 3D space at minimum distance to which to associate the position object. In the GPR technique this point is then projected onto the survey surface, i.e. on a two-dimensional space, which indicates the position (x,y) with respect to the GPR apparatus.

In this way, it is possible to have a plan of the scenario in which visible objects of the scenery and underground objects are virtually superimposed in an advantageous manner with respect to the known art. In fact, in known technique this overlap is only possible using satellite maps, which is not always available, especially in closed places. The present invention, on the other hand, makes it possible to perform such a planimetry, overlapping visible objects and underground objects, even in the absence of GPS signal, also providing a planimetric image with a much higher resolution than satellite images.

This plan allows to have more intuitive references for the localization of underground objects, both to create simpler maps to be consulted and to facilitate the operator during the movement of the GPR equipment.

Advantageously, the GPR apparatus comprises a visual interface and a step is also provided of displaying the plan image $I_P$ of the scenario on the visual interface.

This way, the operator can display its own position in the scenario.

In particular, an iteration is provided, at time range t during the step of handling, of the sub-steps of:
acquiring at least one front image $I_F$;
localizing each pixel $P_i$;
processing, for each pixel $P_i$, coordinates $x_i$ and $y_i$;
reconstructing a plan image $I_P$ of the scenario.

This way, the position displayed within the scenario can be continuously updated, even in real time.

Advantageously, also the front image $I_F$ is displayed on the visual interface.

In particular, on the visual interface, in superimposition to the front image $I_F$ and to the plan image $I_P$, graphic references are displayed for allowing defining a same point of the scenario on the front image $I_F$ and on the plan image $I_P$.

This makes it possible to move the equipment easily even without visible references in the scenario.

Advantageously, the GPR apparatus comprises a localization device which is adapted to provide in real time to the control unit the coordinates $x_c$ and $y_c$.

According to another aspect of the invention, it is claimed a method for ground penetrating radar analysis of a scenario, having a surface, with respect to a Cartesian reference system S(x,y) having origin O(0,0) and axes x and y, said method comprising the steps of:
prearranging a GPR apparatus defining a centre of reference $C(x_c,y_c)$ integral to said GPR apparatus (100), said centre of reference $C(x_c,y_c)$ having coordinates $x_c$ and $y_c$ with respect to said Cartesian reference system S(x,y), said GPR apparatus comprising:
at least one GPR sensor;
a control unit;
at least one image acquisition device, each image acquisition device having a pointing direction $\gamma_j$ known with respect to the centre of reference $C(x_c, y_c)$;
handling the GPR apparatus on the surface;
detecting possible underground objects by means of GPR technique;
whose main feature is that the step of handling comprises the sub-steps of:
acquiring at least one front image $I_F$ of the scenario, each image comprising a plurality of pixels $P_i$;
localizing each pixel $P_i$ of the or each front image $I_F$ with respect to the or each pointing direction $\gamma_j$, the sub-step of localization comprising a definition at least one couple of angles $\vartheta_{xi}$ and $\vartheta_{yi}$ for each pixel $P_i$;
processing, for each pixel $P_i$, coordinates $x_i$ and $y_i$ with respect to said Cartesian reference system S(x,y);
reconstructing a plan image $I_P$ of the scenario, said plan image $I_P$ comprising the plurality of pixels $P_i$ in the coordinates $x_i$ and $y_i$.

Advantageously, steps are provided of:
arrangement within the scenario of a marker of known size;
acquisition by the or each image acquisition device of at least one front image $I_F$ comprising the marker;
calculating by means of the control unit the distance between the marker and the or each image acquisition device.

Alternatively, the GPR apparatus comprises at least one angular position transducer, or encoder, able to detect changes in angular position of the or each image acquisition device.

Alternatively, a step of acquisition of the angular position of the or each image acquisition device with respect to said scenario is provided.

Using one of the systems mentioned above, it is possible to realize the planimetry of the scenario with a single camera. It is in fact possible to obtain the position information from a series of images taken during the acquisition, even in real time.

In fact, the prior art does not allow to obtain the 3D position information of the framed objects (or consequently the GPR coordinates with respect to them) from the images, since it is necessary to obtain a "scale factor". In general, the orientation (in the sense of rotation angles) in the 3D space of the camera relative to its previous position can be derived from the correlation between one image and the next one. The relative position is instead estimated up to a metric factor obtainable by means of a marker, an encoder or the knowledge of the angular position of the camera, as mentioned above.

Once the position of the GPR is known, with respect to a local reference centre, in each acquired frame it is possible to carry out a reverse image transformation to obtain a high resolution cartographic image. For this technique an algorithm is needed that, by interpreting the acquired images, recognizes the objects framed on multiple frames and from different viewing angles.

In particular, the GPR apparatus comprises at least two images acquisition devices having respective pointing directions $\gamma_1$ and $\gamma_2$ known with respect to the centre of reference $C(x_c, y_c)$.

Advantageously, the sub-step of acquisition provides the acquisition of two front images $I_F$ by means of respective images acquisition devices, each front image $I_F$ comprising a plurality of pixels $P_i$, and wherein the sub-step of localization provides the localization of each pixel $P_i$ in each front images $I_F$ and the definition of a couple of angles $\vartheta_{xi}$ and $\vartheta_{yi}$ for each pixel $P_i$.

In particular, they are also provided the sub-steps of:
comparing the front images $I_F$ for identifying pixel $P_i$ corresponding to a same point of the scenario;
localization of each pixel $P_i$ with respect to both the pointing directions $\gamma_1$ and $\gamma_2$.

In this way, there is a three-dimensional localization of the pixels, and therefore a more precise reconstruction of the scenario. In particular, the three-dimensional localization of pixels makes it possible to more accurately calculate the dimensions and relative distances of objects visible in the scenario.

BRIEF DESCRIPTION OF THE DRAWINGS

Further characteristic and/or advantages of the present invention are more bright with the following description of an exemplary embodiment thereof, exemplifying but not limitative, with reference to the attached drawings in which:

FIG. 1 shows a flow chart of the method, according to the present invention, wherein a single image acquisition device is provided;

FIG. 2 shows a flow chart of implementation variant of the method, according to the present invention, wherein two images acquisition devices are provided;

DESCRIPTION OF A PREFERRED EXEMPLARY EMBODIMENT

The flow chart 300 of FIG. 1 shows the steps of a first variant of the method for ground penetrating radar analysis in a scenario, according to the present invention, wherein a single image acquisition device 110 is provided, in particular a video camera or a camera.

The method provides a first step of prearranging a GPR apparatus with a camera on board [310], a second step of handling the apparatus on the surface of the scenario to be investigated [320] and a third step of detecting possible underground objects [330].

Figure 3B:
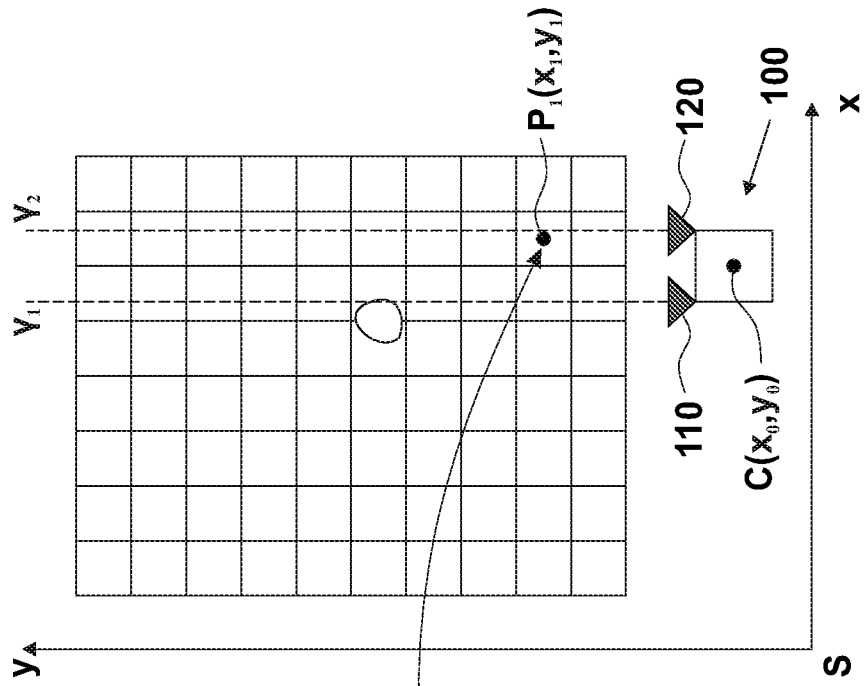
FIG. 3B shows a plan image of the scenario.
Figure 3A:
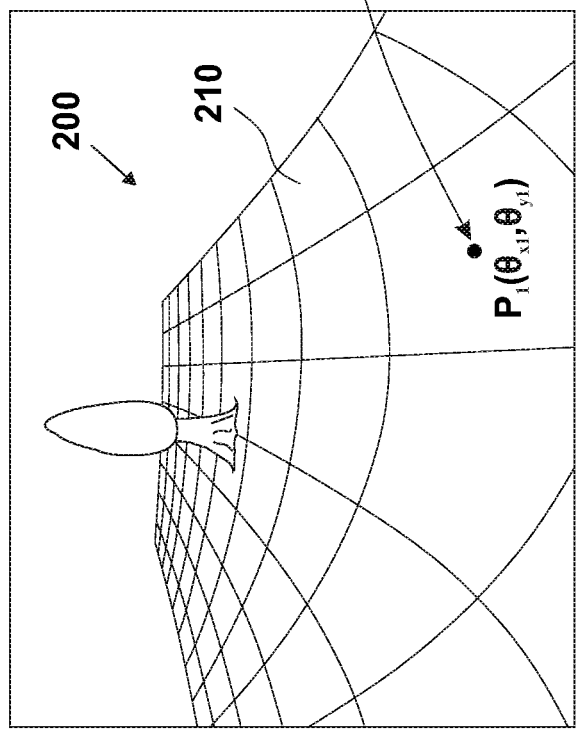
FIG. 3A shows a front image of the scenario.

With reference even at FIGS. 3A and 3B, the method according to the present invention provides that, during the step of handling the apparatus 100, there are some sub-steps arranged to allow the operator to locate, even in real time, the apparatus 100 and to display objects of the scenario 200 in a plan image of the scenario itself, in order to virtually superimpose such objects of the scenario 200 to the detected underground objects.

In particular, there is a sub-step of acquiring by the camera 110 a front image $I_F$ [321], of which a schematic example is shown in FIG. 3A.

Then, by knowing the pointing direction $\gamma_1$ of the camera 110 with respect to the centre of reference $C(x_c, y_c)$ of the apparatus 100, there is a sub-step of localizing each pixel $P_i$ of the image acquired, in terms of angles $\vartheta_{xi}$ and $\vartheta_{yi}$ with respect to the pointing direction $\gamma_1$ [322].

Once localized the pixel $P_i$ with respect to the position of the apparatus 100, it is possible, by transformation of coordinates, to process the $x_i$ and $y_i$ coordinates of each pixel $P_i$ with respect to a Cartesian reference system S(x,y) of known origin and orientation [323].

Finally, by combining all the pixel with respect to their coordinates in the reference system S(x,y), it is possible to reconstruct a plan image $I_P$ of the scenario 200, in order to provide an operator with a top plan view of its own position with respect both to possible underground objects detected, both with respect to objects present in the scenario above the surface 200 [324].

The above described sub-steps are then iterated at predetermined time ranges in such a way that the plan image $I_P$ is updated periodically.

In a variant of the method, schematically shown by the diagram 300' of FIG. 2, two cameras 110 and 120 are provided having respective pointing directions $\gamma_1$ and $\gamma_2$.

In this case, there are two front images $I_F$ obtained and there is an additional sub-step of comparing the front images in order to identify the pixel $P_i$ corresponding to a same point of the scenario 200 [325'].

This way, there is a three-dimensional localization of each pixel, by the acquisition of two couples of angles, and so there is a more precise reconstruction of the scenario.

The foregoing description some exemplary specific embodiments will so fully reveal the invention according to the conceptual point of view, so that others, by applying current knowledge, will be able to modify and/or adapt in various applications the specific exemplary embodiments without further research and without parting from the invention, and, accordingly, it is meant that such adaptations and modifications will have to be considered as equivalent to the specific embodiments. The means and the materials to realise the different functions described herein could have a different nature without, for this reason, departing from the field of the invention. it is to be understood that the phraseology or terminology that is employed herein is for the purpose of description and not of limitation.

The invention claimed is:
1. A method for ground penetrating radar analysis of a scenario, having a surface, with respect to a Cartesian reference system S(x, y) having origin O(0,0) and axes x and y, said method comprising the steps of:
prearranging a GPR apparatus defining a centre of reference $C(x_c, y_c)$ integral to said GPR apparatus, said centre of reference $C(x_c, y_c)$ having coordinates $x_c$ and $y_c$ with respect to said Cartesian reference system S(x, y), said GPR apparatus comprising:
at least one GPR sensor;
a control unit;
at least two image acquisition devices having respective pointing directions $\gamma_1$ and $\gamma_2$ known with respect to said centre of reference $C(x_c, y_c)$;
handling said GPR apparatus on said surface;
detecting possible underground objects by means of GPR technique;
said method characterized in that said step of handling comprises the sub-steps of:
acquiring at least two front images $I_F$ of said scenario by means of respective image acquisition devices, each front image comprising a plurality of pixels;
comparing said front images $I_F$ for identifying pixel $P_i$ of said plurality of pixels corresponding to a same point of said scenario;
localizing each pixel $P_i$ of each front image $I_F$ with respect to both said pointing directions $\gamma_2$ and $\gamma_2$, said sub-step of localization comprising a definition at least one couple of angles $\vartheta_{xi}$ and $\vartheta_{yi}$ for each pixel $P_i$;

processing, for each pixel $P_i$, coordinates $x_i$ and $y_i$ with respect to said Cartesian reference system $S(x, y)$;

reconstructing a plan image I, of said scenario, said plan image $I_P$ comprising said plurality of pixels, each pixel $P_i$ in said coordinates $x_i$ and $y_i$.

2. The method for ground penetrating radar analysis, according to claim 1, wherein said GPR apparatus comprises a visual interface and where a step is also provided of displaying said plan image $I_P$ of said scenario on said visual interface.

3. The method for ground penetrating radar analysis, according to claim 1, wherein, at time ranges t during said step of handling, it is provided an iteration of sub-steps of:
acquiring at least one front image $I_F$;
localizing each pixel $P_i$;
processing, for each pixel $P_i$, coordinates $x_i$ and $y_i$;
reconstructing a plan image $I_P$ of said scenario.

4. The method for ground penetrating radar analysis, according to claim 2, wherein also said front images $I_F$ are displayed on said visual interface.

5. The method for ground penetrating radar analysis, according to claim 4, wherein, on said visual interface, in superimposition to said front images $I_F$ and to said plan image $I_P$, graphic references are displayed for allowing defining a same point of said scenario on said front images $I_F$ and on said plan image $I_P$.

6. The method for ground penetrating radar analysis, according to claim 1, wherein said GPR apparatus comprises a localization device which is adapted to provide in real time to said control unit said coordinates $x_c$ and $y_c$ of said centre of reference $C(x_c, y_c)$ integral to said GPR apparatus.

7. A method for ground penetrating radar analysis of a scenario, having a surface, with respect to a Cartesian reference system $S(x, y)$ having origin $O(0,0)$ and axes x and y, said method comprising the steps of:
prearranging a GPR apparatus defining a centre of reference $C(x_c, y_c)$ integral to said GPR apparatus, said centre of reference $C(x_c, y_c)$ having coordinates $x_c$ and $y_c$ with respect to said Cartesian reference system $S(x, y)$, said GPR apparatus comprising:
at least one GPR sensor;
a control unit;
at least one image acquisition device, each image acquisition device having a pointing direction $\gamma$ known with respect to said centre of reference $C(x_c, y_c)$;
handling said GPR apparatus on said surface;
detecting possible underground objects by means of GPR technique;

said method characterized in that said step of handling comprises the sub-steps of:
acquiring at least one front image $I_F$ of said scenario, each image comprising a plurality of pixels;
localizing each pixel $P_i$ of said plurality of pixels of said at least one front image $I_F$ with respect to said each pointing direction $\gamma_j$, said sub-step of localization comprising a definition of at least one couple of angles $\vartheta_{xi}$ and $\vartheta_{yi}$ for each pixel $P_i$;
processing, for each pixel $P_i$, coordinates $x_i$ and $y_i$ with respect to said Cartesian reference system $S(x, y)$;
reconstructing a plan image I, of said scenario, said plan image $I_P$ comprising said plurality of pixels, each pixel $P_i$ in said coordinates $x_i$ and $y_i$.

8. The method for ground penetrating radar analysis, according to claim 7, wherein steps are provided of:
arrangement within said scenario of a marker of known size;
acquisition by said or each image acquisition device of at least one front image $I_F$ comprising said marker;
calculating by means of said control unit a distance between said marker and said centre of reference $C(x_c, y_c)$.

9. The method for ground penetrating radar analysis, according to claim 7, wherein said GPR apparatus comprises at least one angular position transducer, or encoder, able to detect changes in angular position of said or each image acquisition device.

10. The method for ground penetrating radar analysis, according to claim 7, wherein a step of acquisition of an angular position of said or each image acquisition device with respect to said scenario is provided.

11. The method for ground penetrating radar analysis, according to claim 7, wherein said GPR apparatus comprises at least two images acquisition devices having respective pointing directions $\gamma_1$ and $\gamma_2$ known with respect to said centre of reference $C(x_c, y_c)$.

12. The method for ground penetrating radar analysis, according to claim 11, wherein said sub-step of acquisition provides an acquisition of two front images $I_F$ by means of respective images acquisition devices, each front image $I_F$ comprising a plurality of pixels, and wherein said sub-step of localization provides localization of each pixel $P_i$ in each of said front images $I_F$ and a definition of a couple of angles $\vartheta_{xi}$ and $\vartheta_{yi}$ for each pixel $P_i$.

13. The method for ground penetrating radar analysis, according to claim 12, also provides the sub-steps of:
comparing said two front images $I_F$ for identifying pixel $P_i$ corresponding to a same point of said scenario;
localizing each pixel $P_i$ with respect to both said pointing directions $\gamma_1$ and $\gamma_2$.

* * * * *